May 19, 1931.  L. SHARP  1,805,927
MOWING MACHINE
Filed Feb. 27, 1929   2 Sheets-Sheet 1
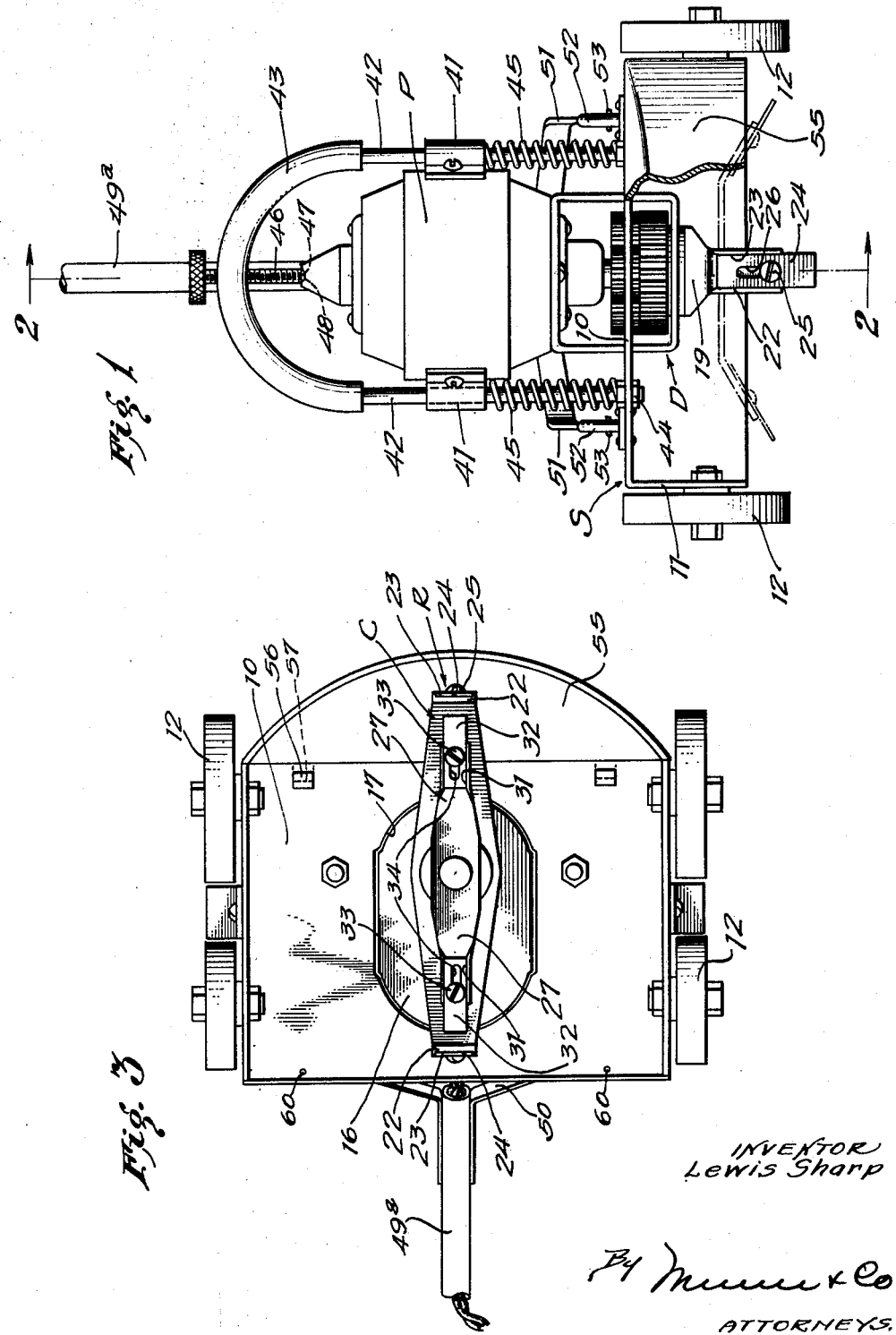

May 19, 1931.  L. SHARP  1,805,927
MOWING MACHINE
Filed Feb. 27, 1929   2 Sheets-Sheet 2
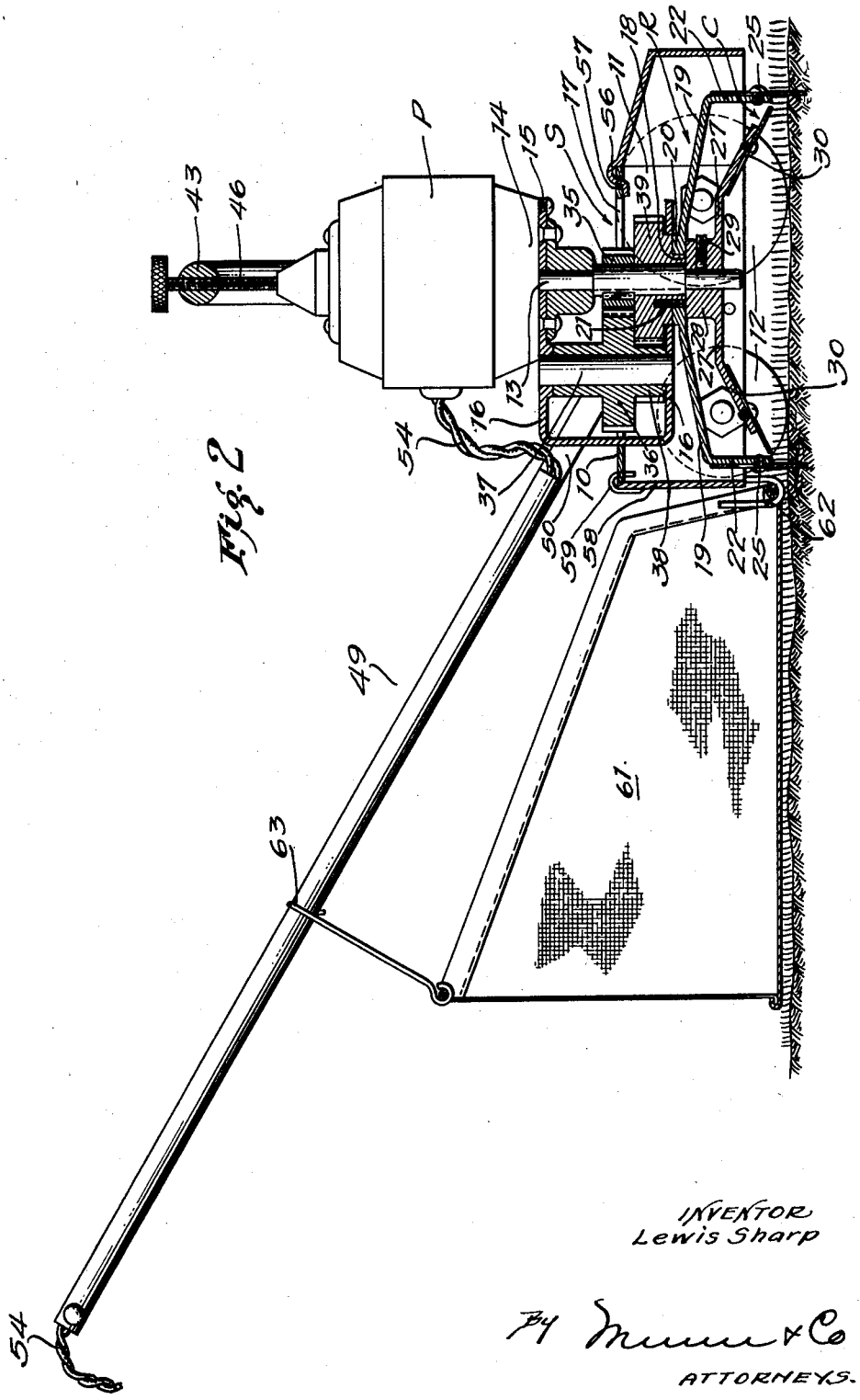
INVENTOR
Lewis Sharp
BY Munn & Co
ATTORNEYS.

Patented May 19, 1931

1,805,927

UNITED STATES PATENT OFFICE

LEWIS SHARP, OF HUNTINGTON PARK, CALIFORNIA

MOWING MACHINE

Application filed February 27, 1929. Serial No. 343,182.

My invention relates to and has for a purpose the provision of a mowing machine, particularly adapted although not necessarily for the mowing of lawns, and embodying simple and substantial means by which the grass of a lawn can be mowed to a predetermined height irrespective of the height to which the grass has grown, or the lawn "peeled" of the grass in the event that a new lawn is to be made.

It is a further purpose of my invention to provide a machine embodying means by which the removal of streamers of Bahama or Bermuda grass, traversing the lawn on and below the surface between the upright shoots of grass, can be effected with the utmost ease and dispatch. The removal of such streamers of Bermuda grass or other like forms of pest grasses is vital to the existence as well as to the appearance of a lawn, for should such pest grasses be permitted to grow uncontrolled, the streamers thereof ultimately form a mat preventing the growth of the usual lawn grasses and clover.

It is a further purpose of my invention to provide a machine by which the mowing of the usual types of lawn grasses and the removal of the streamers of pest grasses can be effected concurrently, thus dispensing with the necessity of raking or otherwise removing the streamers of the pest grasses in an operation separate from the mowing of the lawn.

I will describe only one form of mowing machine embodying my invention and will then point out the novel features thereof in claims.

In the accompanying drawings,

Fig. 1 is a view in front elevation of one form of mowing machine embodying my invention.

Fig. 2 is a vertical central sectional view taken on the line 2—2 of Fig. 1 and looking in the direction of the arrows.

Fig. 3 is a bottom plan view of the mowing machine shown in the preceding views.

Referring specifically to the drawings in which similar reference characters designate similar parts in each of the several views, my invention in its present embodiment comprises a support S including a rectangular platform 10 having depending side flanges 11 in which are journaled pairs of wheels 12 to mount the platform horizontally in an elevated position for rolling movement of the support S over a lawn.

The support S provides a mounting for a power unit P, cutting and raking elements C and R respectively, and a driving connection D between the power unit and elements. The power unit P in the present instance comprises an electric motor having its armature shaft 13 vertically disposed and depending from the motor. To the underside of the motor housing 14 is secured by bolts 15, a frame 16 which projects freely through an opening 17 in the platform 10 and provides a journal for the lower extremity of the shaft 13 and for a sleeve 18 which is rotatably mounted on the shaft.

To the lower end of the sleeve 18 below the frame 16 and platform 10, the raking element R is fixed, and in the present instance the raking element comprises a pair of arms 19 projecting in diametrically opposed directions from a central hub 20 fixed to the sleeve 18 by a key 21. The outer extremities of the arms terminate in vertically depending extensions 22 provided on their outer faces with recesses 23 in which raking members 24 in the form of blunt edged rectangular strips of metal are slidably received and rendered vertically adjustable by means of threaded studs 25 extending through vertical slots 26 in the raking members and threaded into the extensions 22. It will be clear that when the screws are loosened the positions of the raking members can be varied vertically, and that by tightening the screws, the raking members will be securely clamped in fixed positions to the extensions 22.

The lower extremity of the shaft 13 projects below the hub 20 of the raking element R, and to the shaft immediately below the element R is secured the cutting element C which in the present instance comprises a pair of arms 27 projecting in diametrically opposed directions from a central hub 28 fixed to the shaft 13 by a set screw 29 and terminating at their outer extremities in downwardly and outwardly inclined extensions 30 having recesses 31 on their undersides slidably receiving cutting blades 32 in the form of rectangular strips of metal. The cutting blades are rendered adjustable in the extensions 30 inwardly and outwardly of the arms 27 to compensate for wear on the blades, by means of threaded studs 33 extending through slots 34 in the blades and threaded into the extensions 30. It will thus be clear that by loosening the studs 33, the blades can be readily adjusted, and that by tightening the studs, the blades will be securely clamped in fixed positions to the extensions 30.

The cutting element C being fixed directly to the armature shaft 13 will be rotated at the same speed as the power unit, whereas the raking element R is driven at a comparatively slow speed by means of a train of gearing comprising a pinion gear 35 fixed to the shaft 13 within the frame 16, constantly meshing with a relatively large gear 36 fixed to a shaft 37 journaled vertically in the frame 16 at the rear side of the shaft 13. To the shaft 37 below the gear 36 is fixed a pinion gear 38 constantly meshing with a relatively large gear 39 fixed to the upper end of the sleeve 18 immediately below the pinion gear 35. By the provision of the above described train of gears the raking element R will be driven at a slower speed than and in the same direction as the cutting element C.

The power unit, frame 16, train of gearing and cutting and raking elements form a unitary structure supported from the platform 10 in a manner to be rendered vertically adjustable to vary the positions of the cutting and raking elements vertically with respect to the surface of the ground over which the machine is traveling, and to this end, the housing 14 of the power unit is provided at diametrically opposed points with vertical sleeves 41 slidably mounted on vertically disposed and parallel portions 42 of a yoke 43 receiving the power unit as clearly shown in Fig. 1. The lower extremities of the vertical portions 42 extend through openings in the platform and are secured to the latter to rigidly support the yoke on the platform by means of nuts 44 threaded on the portions 42 above and below the platform.

The power unit is normally biased upwardly by coiled compression springs 45 surrounding the vertical portions 42 between the sleeves 41 and the platform, and is adapted to be moved downwardly and maintained in a selected position of vertical adjustment against the biasing action of the springs 45, by means of an adjusting screw 46 threaded vertically into the yoke in axial alinement with the armature shaft 13 and seating at its lower conically shaped extremity 47 in an axial socket 48 formed on the housing 14.

The machine is adapted to be moved manually over a lawn by means of a handle 49 having a shank 49$^a$ terminating at its lower extremity in a yoke 50 having parallel spaced arms 51 seating in sockets 52 formed on the platform 10. The arms 51 are removably held against displacement from the sockets by means of suitable pins 53 so as to support the handle 49 in the upwardly and rearwardly inclined position shown in Fig. 2 and yet permit removal of the handle when desired. The handle is hollow to receive flexible conductors 54 leading to the power unit P so that with the conductors connected to a suitable source of electrical energy, the power unit will be driven.

To the front edge of the platform 10 is removably fitted an arcuate hood 55 by means of tongues 56 entering openings 57 in the platform, and to the rear edge of the platform is removably fitted a closure plate 58 by means of tongues 59 on the plate entering openings 60 in the platform to suspend the plate from the platform.

The platform 10, side flanges 11 thereof, the hood 55 and the plate 58 co-operate to provide an enclosure for the cutting and raking elements C and R to prevent promiscuous scattering of grass as removed from a lawn by the elements. The plate 58, when removed, provides an opening at the rear of the support through which grass as removed from a lawn is adapted to be discharged under the rotational movement of the cutting and raking elements into a grass catcher 61 adapted to be attached at its forward end to the support S by suitable clips 62 on the side flanges 11, and suspended at its rear end from the handle 49 by means of a hook 63.

The operation of the machine is as follows:

Assuming that a lawn having Bermuda grass growing therein is to be mowed to a predetermined height and the streamers of the Bermuda grass traversing the lawn in various directions between the upright shoots of the usual forms of grass and clover constituting the lawn, are to be removed therefrom, the cutting and raking elements C and R respectively are adjusted vertically by rotation of the adjusting screw 46 in one direction or the other, until the lower extremities of the raking members 24 are positioned to enter the ground to a depth of from ½ to 1 inch when the machine is in operation on the lawn. The cutting element C can be adjusted vertically on the shaft 13 upon loosening of the set screw 29 to position the outer extremities of the blades 32 at the height from the ground at which the upright shoots of lawn grass are to be cut. With the power plant P in operation and the machine moved bodily over the lawn by an operator, it will be clear that the raking members 24 will describe a circular path in substantial parallelism with the ground surface and will rip apart and rake up the Bermuda grass streamers traversing the lawn, and that due to the fact that the raking members travel edgewise vertically and at a comparatively slow speed through the upright shoots of lawn grass, the latter will not be cut or in any way injured by the raking members. Concurrently with the raking action of the raking element R, the cutting element C will rotate at a much higher speed, it being found in practice that with the cutting element traveling at a speed of approximately 3000 R. P. M., a speed of approximately 750 R. P. M. for the raking element will be satisfactory for the latter to perform its raking function effectively without injury to the upright shoots of grass.

As the blades 32 of the cutting element C also describe a circular path in substantial parallelism with the ground over which the machine is traveling, and immediately within the circular path of the raking members 24, as well as are presented edgewise and across the upright shoots of grass, the latter will be mowed down to the predetermined height, and all the Bermuda grass streamers which have been raked up sufficiently by the raking members 24 in advance of the cutting blades 32, will be mowed down by the latter. As the elements C and R rotate, the cut grass and sections of the grass streamers freed from the lawn are thrown tangentially outward under the rotational movements of the elements and are confined against promiscuous scattering by the enclosure formed by the side flanges 11, hood 55 and closure plate 58. With the closure plate removed and the grass catcher applied, the cut grass and streamers will be discharged under the rotational movement of the elements through the resulting opening in the rear of the enclosure and deposited in the grass catcher. It has been found in practice that the leading edges of the cutting blades 24 need not be sharp, as due to the high rotational speed of the cutting element the blades are effective to sever the upright shoots of grass without the requirement of a sharp cutting edge. Furthermore with the leading vertical edges of the raking members 24 left blunt, they are rendered amply effective to rip up and apart, the Bermuda grass streamers on and immediately below the surface so that the latter will be either freed from their roots and deposited in the grass catcher, or raked up sufficiently to be severed by the cutting blades 24 and finally deposited in the catcher.

In the event that a lawn is to be mowed only, the raking members 24 are removed from the raking element R by unscrewing the studs 25 from the extensions 22. The position of the cutting element C is adjusted vertically to effect mowing of the grass to the desired height, by manipulating the adjusting screw 46, and the machine then moved bodily over the lawn. As the machine is moved back and forth over the lawn it will be clear that a strip of lawn equal in width to the circle described by the outer extremities of the cutting blades will be mowed. If exceedingly high grass is to be cut, the hood 55 is removed, as its position in advance of the cutting element would cause it to bend the grass down and thus prevent proper cutting of the grass by the blades 32.

Should it be desired to "peel" the lawn, that is to remove all grass therefrom to a point below the surface of the ground, preparatory to putting in a new lawn, the cutting element C is lowered by manipulating the adjusting screw 46 until the outer extremities of the cutting element will cut the sod at the desired depth when the machine is moved over the lawn.

In the event that it is only desired to remove Bermuda grass streamers from a lawn, the cutting blades 32 are removed from the cutting element C and the raking members adjusted as previously described, after which the machine is moved bodily over the lawn. When the grass catcher is not being used, the closure plate 58 is suspended from the platform 10 to prevent scattering of the cut grass rearwardly of the machine. When the machine is to be moved from the lawn, it is desirable to elevate the power unit P to its highest position to prevent damage to the cutting blades 32 and raking members 24 as a result of contact of these parts with obstacles on the ground over which the machine is rolled.

From the foregoing description it will be clear that my invention in a broad aspect provides cutting and raking elements either or both of which is rendered capable of being used, in accordance with the particular operations to be performed on the lawn, with a suitable means by which the elements are mounted for movement bodily over a lawn and preferably for rotary movements about substantially vertical axes so as to describe circular paths in substantial parallelism with the surface of the ground over which the elements are moved bodily. Also that a suitable power unit and power transferring means are preferably provided on the machine for driving the elements at the speeds deemed necessary for the performance of the respective functions of the elements with maximum efficiency.

Although I have herein shown and described only one form of mowing machine embodying my invention, it is to be understood that various changes and modifications may be made therein without departing from the spirit of the invention and the spirit and scope of the appended claims.

I claim:

1. A machine of the character described comprising a raking element having blades, means for mounting the element for rotary movement about a vertical axis and for movement bodily over a lawn, with the blades of the element positioned substantially vertical, and to travel edgewise through the grass of the lawn as the element is rotated, whereby the blades will effect raking up of grass streamers traversing the lawn in response to rotation of the element during movement thereof bodily over the lawn, and means for rotating the element.

2. A machine of the character described comprising a cutting element, a raking element, means for mounting said elements for movement bodily over a lawn and for rotary movements about vertical axes, with the elements so positioned vertically and with respect to each other that as they are rotated during movement thereof bodily over the lawn, the cutting element will effect mowing of upright shoots of grass and the raking element will effect ripping apart and raking of grass streamers traversing the lawn, into the path of the cutting element for cutting by the latter, and means for rotating the elements.

3. A machine of the character described comprising a cutting element, a raking element, means for mounting said elements for movement bodily over a lawn and for rotary movements about a common vertical axis, with the elements so positioned vertically that as they are rotated during movement thereof bodily over the lawn, the cutting element will effect mowing of upright shoots of grass and the raking element will effect raking up of grass streamers traversing the lawn, and means for rotating the elements.

4. A machine of the character described comprising a cutting element, a raking element, means for mounting said elements for movement bodily over a lawn and for rotary movements about a common vertical axis, with the elements so positioned vertically that as they are rotated during movement thereof bodily over the lawn, the cutting element will effect mowing of upright shoots of grass and the raking element will effect raking up of grass streamers traversing the lawn, means for rotating the elements, and an enclosure for the elements for confining against scattering, grass removed from the lawn by the elements, and having an opening through which the cut grass is adapted to be discharged into a grass catcher under the rotational movements of the elements.

5. A machine of the character described comprising a raking element having depending raking members, means for mounting the element for movement bodily over a lawn and for rotary movement about a vertical axis, with the raking members so positioned vertically as to rip apart and rake up streamers of grass traversing the lawn, in response to rotation of the element during movement thereof bodily over the lawn, means for rotating the element, and an enclosure for the element for confining against scattering, streamers of grass raked up by the element.

6. A machine of the character described comprising a wheeled support having an elevated platform, a power unit supported on the platform, a vertically disposed and rotatably mounted shaft operatively connected to the power unit for rotation by the latter, a cutting element fixed to the shaft and disposed below the platform, a sleeve rotatably mounted on the shaft, a raking element fixed to the sleeve and disposed below the platform, and means for driving said elements from the power unit.

7. A machine of the character described comprising a wheeled support having an elevated platform, a power unit supported on the platform, a vertically disposed and rotatably mounted shaft operatively connected to the power unit for rotation by the latter, a bladed element fixed to the shaft and disposed below the platform, a sleeve rotatably mounted on the shaft, a raking element fixed to the sleeve and disposed below the platform, and means for driving the raking element from the power unit at a speed less than that of the cutting element, comprising a train of intermeshing gears, one of which is fixed to the shaft and another to the sleeve.

8. A machine of the character described comprising a wheeled support including an elevated platform having an opening therethrough, a power unit, means for supporting the power unit on the platform for adjustment vertically, a frame supported by the power unit below the latter and extendable through the opening of the platform, an element for operating upon the grass of a lawn, disposed below the platform, and means operatively connected to the power unit for mounting said element from the frame for rotation about a vertical axis.

9. A machine as embodied in claim 8 wherein said means for supporting the power unit on the platform for adjustment vertically comprises a yoke having parallel vertical portions secured to the platform, sleeves on the power unit slidably mounted on said vertical portions of the yoke, means for biasing the platform upwardly, and means for moving the power unit downwardly and maintaining it in a selected position of vertical adjustment against the biasing action of the last means.

LEWIS SHARP.